United States Patent

[11] 3,584,888

| [72] | Inventor | Frederick Joseph Lott<br>Saffron Walden, England |
|---|---|---|
| [21] | Appl. No. | 717,257 |
| [22] | Filed | Mar. 29, 1968 |
| [45] | Patented | June 15, 1971 |
| [73] | Assignee | Light & Power Accessories Company Limited<br>Saffron Walden, England |
| [32] | Priority | Mar. 31, 1967 |
| [33] | | Great Britain |
| [31] | | 14766/67 |

[54] CABLE GLAND FOR ELECTRIC CABLE
2 Claims, 6 Drawing Figs.

[52] U.S. Cl. .................................................. 277/138,
174/65, 174/153
[51] Int. Cl. ......................................................F16k 41/00,
H01b 17/00
[50] Field of Search............................................ 277/147,
149, 152, 138, 178; 174/65, 65.1, 65 G, 153, 153 G

[56] References Cited
UNITED STATES PATENTS

| 2,311,427 | 2/1943 | Winkelmeyer | 174/153 G (UX) |
| 2,631,906 | 3/1953 | Brock | 277/152 |
| 2,926,210 | 2/1960 | Sturges | 174/153 UX |
| 2,958,551 | 11/1960 | Rogers | 277/152 X |
| 3,109,662 | 11/1963 | Bergstrom | 174/153 G (UX) |
| 3,162,411 | 12/1964 | Duggan | 277/178 X |
| 3,324,228 | 6/1967 | Larsson | 174/65 |

FOREIGN PATENTS

| 1,386,348 | 12/1964 | France | 174/65.1 |

Primary Examiner—Laverne D. Geiger
Assistant Examiner—Robert I. Smith
Attorney—Birch, Swindler, McKie & Beckett ABSTRACT: This invention provides a gland for electric cables comprising a grommet of resilient material having a tapered axial hole which is distended by a cable when forced into the gland so that radial pressure is exerted on the cable whereby a fluidtight seal is formed between the grommet and the cable. The grommet has a reduced diameter portion which is encircled by a collar which can be tightened to constrict the cable so that axial displacement of the cable is prevented.

CABLE GLAND FOR ELECTRIC CABLE

This invention relates to a cable gland for an electric cable more particularly a cable having an outer sheath of rubber or plastic.

Such cables, more especially if sheathed with polyvinylchloride or polychloroprene, are liable to be pulled through a gland. Such sheathings have a waxlike surface and the difficulty with cables having such sheathings is that they can be axially dislodged in glands due to the waxlike surfaces. It is an object of this invention to provide a low cost gland for an electric cable which gland resists pull on the cable and which also provides a fluidtight seal where the cable passes into a casing such as a junction box.

According to this invention a cable gland comprises a sealing grommet of resilient material and a constricting element encircling the grommet, the element, when constricted, exerting radial pressure on the grommet to secure the cable therein.

More particularly the invention comprises a sealing grommet of resilient material adapted to be expanded by the insertion of the cable therein to form a fluidtight seal between the cable and the grommet, and a constricting collar encircling the grommet and adapted to exert radial pressure in a narrow band around the periphery of the grommet and hence onto the cable so that the cable is secured in the grommet.

A preferred embodiment of the invention will now be described, by way of example, with reference to the accompanying drawings, in which.

Figure 1:
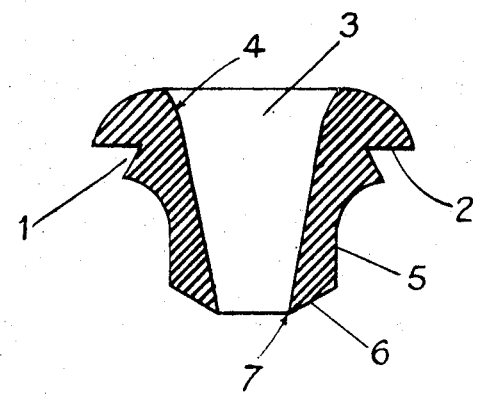
FIG. 1 is an axial section of a grommet in accordance with the invention.
Figure 2:
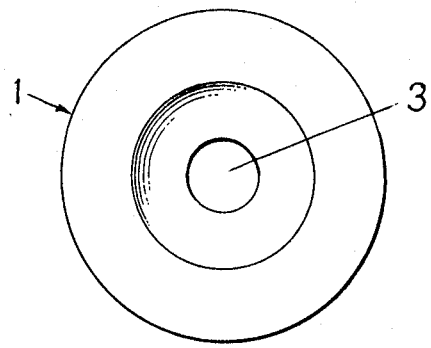
FIG. 2 is a plan thereof.

Referring to FIGS. 1 and 2, the grommet may be moulded from rubber or a suitable plastic, for example, polyvinylchloride or polychloroprene. The grommet has a "V" section annular groove 1 providing a surface 2 which seats against the exterior wall of a junction box, for example. The grommet is forced into a hole in the box so that the edge of the hole fits into the groove. Thus, the grommet is secured to the box and a fluidtight seal is formed between the grommet and the box. Axially of the grommet is a tapered hole 3 which may be radiused as at 4 to permit the easy introduction of the cable into the hole. The grommet has a reduced diameter portion 5 the exterior end of which is bevelled as at 6 providing a sharp edge 7. The diameter of the hole 3, at approximately half its length, equals that of the cable, therefore when the cable is forced into the hole, the reduced diameter portion 5 is expanded, as indicated by chain lines, so that the edge 7 tightly grips the cable and forms an effective fluidtight seal between the grommet and the cable, the seal being enhanced by the flexibility of the edge.

Figure 4:
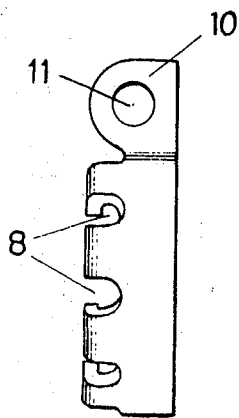
FIG. 4 is a side elevation thereof.
Figure 3:
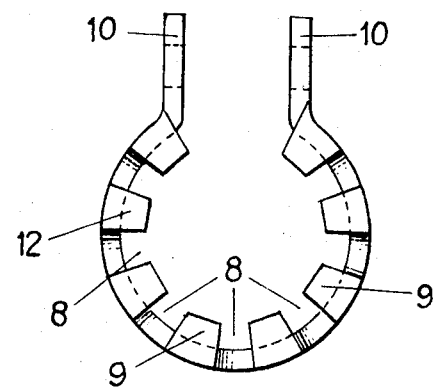
FIG. 3 is an elevation of a collar for use with the grommet shown in FIG. 1.
Figure 5:
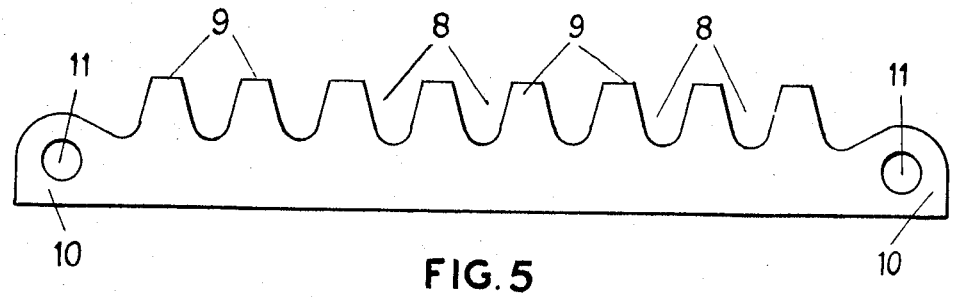
FIG. 5 is a development of the collar.
Figure 6:
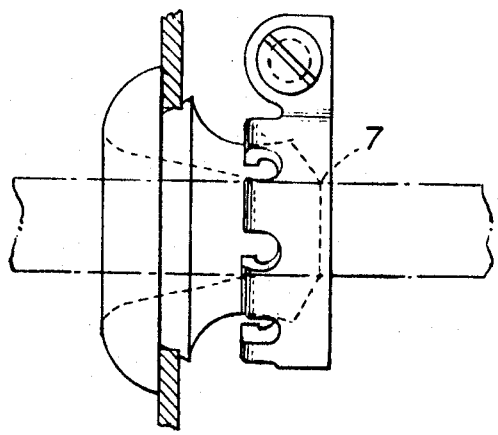
FIG. 6 is an elevation of the grommet with the collar applied thereto.

Referring to FIGS. 3, 4 and 5 the collar may be formed from strip material or moulded in a suitable plastic. A development of a collar formed from strip metal, aluminum for example, is shown in FIG. 5.

Formed in one longitudinal edge of the strip is a series of equally spaced notches 8 and teeth 9 shaped as shown in FIG. 5. At each end of the strip is a lug 10 having a hole 11 to receive a bolt for contracting the collar. That portion of the strip having the notches and teeth is bent at right angles to the surfaces of the strip, thus forming a flange 12. The strip with its flange is then formed into an annulus and the lugs 10 are bent so that they are substantially parallel to each other as indicated in FIG. 3.

It will be apparent that the notches in the flange 12 enables the strip to be formed into an annulus. Therefore, the notches need not necessarily be of the shape shown in FIG. 5.

When the bolt in the lugs 10 of the collar is tightened, the edges of the flange 12 constituted by the teeth 9, bite into the grommet and compress it onto the cable thus firmly securing the cable in the gland and also prevents the grommet being inadvertently pulled out of the box.

The gland described is suitable for cables having a wide range of diameters. By suitably shaping the axial hole in the grommet noncircular cables can be gripped and sealed in the gland.

If so desired, the collar may have more than one flange whereby the clamping effect of the collar may be enhanced.

What I claim is:

1. A cable gland for passing a cable through a member comprising in combination a resilient grommet and a compression collar, said grommet comprising:

an axial passage through which said cable passes, said passage being tapered from a diameter greater than the diameter of said cable at one end thereof to a diameter less than the diameter of said cable at the other end thereof, the diameter of said passage being equal to the diameter of said cable at approximately the midpoint of said passage, an annular V-shaped groove about the periphery of said grommet adjacent said one end for sealingly engaging said member, an exterior bevel about the periphery of said grommet at said other end, said bevel terminating at said passage in a sharp edge to apply radially inward pressure upon said cable when said cable is passed therethrough and thereby form a fluidtight seal, and an inwardly curved reduced diameter portion about the periphery of said grommet intermediate said V-shaped groove and said bevel, at least a portion of said reduced diameter portion being between said midpoint and said other end, said compression collar comprising:

a flange having a plurality of inwardly facing teeth completely encircling said grommet and engaging said reduced diameter portion, means for tightening said compression collar about said reduced diameter portion so that said teeth exert a high clamping pressure on a narrow band about the entire periphery of said reduced portion to sealingly clamp said grommet and said cable together around the full circumference thereof.

2. A cable gland according to claim 1 wherein said teeth engage said reduced diameter portion at a point between said midpoint of said passage and said other end.